United States Patent [19]

Gill

[11] Patent Number: 5,128,050

[45] Date of Patent: Jul. 7, 1992

[54] METHOD FOR CONTROLLING ZEBRA MUSSELS IN SHIP BALLAST TANKS

[75] Inventor: Patrick H. Gill, Zelienople, Pa.

[73] Assignee: Calgon Corporation, Pittsburgh, Pa.

[21] Appl. No.: 695,878

[22] Filed: May 6, 1991

[51] Int. Cl.⁵ .............................................. C02F 1/50
[52] U.S. Cl. ..................................... 210/755; 210/764
[58] Field of Search ...................... 210/755, 764–766, 210/698, 749; 514/642

[56] References Cited

U.S. PATENT DOCUMENTS

| | | | |
|---|---|---|---|
| 4,462,914 | 7/1984 | Smith | 210/755 |
| 4,579,665 | 4/1986 | Davis et al. | 210/764 |
| 4,643,835 | 2/1987 | Koeplin-Gall et al. | 210/764 |
| 4,789,489 | 12/1988 | Hollis et al. | 210/764 |
| 4,906,385 | 3/1990 | Lyons et al. | 210/764 |
| 5,008,075 | 4/1991 | Rufolo | 210/764 |
| 5,015,395 | 5/1991 | Muja et al. | 210/755 |

*Primary Examiner*—Thomas Wyse
*Attorney, Agent, or Firm*—W. C. Mitchell; C. M. Caruso

[57] ABSTRACT

A method for controlling zebra mussels in ship ballast tanks comprising treating ballast water which contains zebra mussels or which is prone to zebra mussel infestation with an effective amount of a didecyl dimethyl ammonium halide. A preferred compound is a didecyl dimethyl ammonium chloride.

6 Claims, No Drawings

METHOD FOR CONTROLLING ZEBRA MUSSELS IN SHIP BALLAST TANKS

BACKGROUND OF THE INVENTION

The present invention relates to the control of zebra mussels (*Dreissena polymorpha*) in ballast tanks by utilizing as a molluscicide an effective amount of a didecyl dimethyl ammonium halide.

Water is oftentimes used as ballast in ships to provide stability. In general, the ballast water lowers the ship's center of gravity to a desired level when there isn't cargo on board which would provide the same effect. If ballast water is drawn into a ship's ballast tanks from zebra mussel-infested water, it can infest the body of water into which it is discharged. There is therefore a strong need in the art to control zebra mussels in ballast water.

Zebra mussels recently have been discovered in the Great Lakes. It is believed that these mollusks were carried to North America in the ballast of ships from Europe. Zebra mussels reproduce quickly, and attach to virtually any hard surface in contact with an aqueous system in which they are present. These organisms are particularly troublesome to industrial and municipal users of fresh water, as zebra mussels can quickly foul water intakes and process equipment.

Zebra mussels fall within the class Bivalvia of the phylum Mollusca. The mature mussels are characterized by threadlike tenacles (byssal threads) which enable them to attach themselves to virtually any hard underwater surface. Since a zebra mussel is particularly adherent to the shell of another zebra mussel, these mollusks tend to "stack up", one upon another, so that they can completely clog intake orifices. Additionally, the threads enable the mussels to affix themselves to a surface which is positioned in any plane relative to horizontal. Thus, unlike other mollusks such as Asian clams (Corbicula), zebra mussels are found on the ceilings, vertical surfaces and floors of under water equipment.

On a daily basis, vast quantities of water are removed from rivers, lakes and streams for potable water use and for use in a variety of industrial processes. The greatest industrial use of water is for cooling purposes, and the greatest nonconsumptive industrial demand for water as a heat transfer medium comes from the steam-electric generating industry. Also, municipalities draw water for public consumption.

Source water supports an abundance of biological life forms, many of which cannot be removed from the water before it is used. While some of these biological life forms may not adversely affect municipal or industrial treatment processes, zebra mussels are biofouling organisms which have become a severe problem in North America in a very short time. These mussels foul intake piping and equipment surfaces in municipal water treatment plants and in industrial water systems.

It is believed that zebra mussels did not become prevalent in Lake Erie until late 1988 or 1989. They are now rapidly spreading into Lake Michigan and into the rivers of the Midwest and Northeast. In a relatively short time, they can reach population densities in excess of 30,000 mussels per square meter. For this reason, zebra mussels can completely shutdown municipal and industrial systems which rely on fresh water infested with zebra mussels. It is believed that zebra mussel fouling will eventually threaten virtually every domestic municipal, utility and industrial user of fresh water that draws its supply from a source which is in fluid communication with the Great Lakes.

Zebra mussel fouling of such equipment as intake piping and steam condensers can be extremely troublesome. Immature or small mussels are easily drawn through intake screens. Once inside a system, they can lodge anywhere. The problem is made worse by the fact that, in the larval state, zebra mussels are carried by flowing water throughout treatment and/or process systems.

DISCUSSION OF RELEVANT ART

In Europe, it is common to utilize dual intake systems to handle zebra mussel problems, so that one system can be mechanically cleaned while the other is in operation, or to draw source water from depths where the maximum water temperature is too cold (below about 13° C.) for zebra mussels to reproduce. The treatment of ballast water, however, is not known in the art. The instant method for controlling zebra mussels in ballast water is therefore a novel chemical treatment method. In this method, a didecyl dimethyl ammonium halide is added to zebra-infested water in a ship's ballast tank, thereby controlling and/or killing the zebra mussels prior to discharge of the ballast water.

Chemical agents for controlling zebra mussels, including chlorine and other oxidizing agents, have been used. However, chlorine is not desirable for environmental reasons.

U.S. Pat. No. 4,462,914 to Smith discloses the use of polyquats such as dimethyl diallyl ammonium chloride polymers to control Asian clams (Corbicula). However, this patent is silent regarding the efficacy of didecyl dimethyl ammonium halides as agents to control zebra mussels, and the use of the same to treat ballast water.

It is also noteworthy that dialkyl diallyl ammonium polymers are widely used in municipal and industrial water treatment. For example, dimethyl diallyl ammonium chloride polymers are added as clarification aids to the water intakes of municipal potable water plants. To the best of the inventor's knowledge, however, didecyl dimethyl ammonium halides have not been added to control zebra mussel growth or fouling in ballast waters.

Additionally, polyquaternary compounds have been utilized for control of microorganisms such as bacteria, fungi, and algae in aqueous systems. See, e.g., U.S. Pat. Nos. 4,113,709 and 4,111,679. Simple quaternary ammonium compounds have been used to control fouling by microorganisms and molluscs. See, e.g., Nashimura et al., Japan Kokai No. 74 81,535 (1974); Roth, German Offenlegungsschrift No. 2,642,606; and Sindery, French Pat. No. 1,460,037.

Ramsey et al, "Effects of Nonoxidizing Biocides on adult *Corbicula fluminea*" (1988), disclose the application of various biocides, including dodecylguanidine hydrochloride (DGH), benzalkonium chloride, pyridinium chloride, dioctyl dimethyl ammonium chloride, poly[oxyethylene(dimethylimino)-ethylene (dimethylimino)-ethylene dichloride], glutaraldehyde, 2,2-dibromo-3-nitrilo propionamide, N-4-dihydroxy-α-oxo-benzene ethanimidoyl chloride, 5-chloro-2-methyl-4-isothiazolin-3-one/2-methyl-4-isothiazolin-3-one, N-[(α)-(1-nitroethyl) benzyl]ethylenediamine and 2-(tert-butylamino)-4-chloro-6(ethylamine)-5-triazine, for the purpose of controlling Asian clams. It is noted that dioctyl dimethyl ammonium chloride is shown not to be effective for this purpose, and that the addition of these additives to ballast waters is not known or suggested.

U.S. Pat. No. 4,816,163, to Lyons et al, discloses the use of water-soluble alkyl guanidine salts, alone or in combination with methylene bis-thiocyanate or alkyl dimethyl benzyl ammonium chloride, to control the biofouling of macroinvertebrates, particularly *Corbicula*. At column 2, lines 18-20, the '163 patent states that: "Another fresh water mollusk, Dreissna — the zebra mussel, causes fouling problems in Europe to cooling systems in a similar manner as the Asiatic Clam." The inventor notes, however, that Asiatic clams do not rapidly adhere to hard surfaces, instead remaining in areas where silt deposits are present. Thus, Asiatic clams do not coat underwater vertical or "ceiling" surfaces, as do zebra mussels. Also, Asian clams tend to move around in silt and mud, while zebra mussels are generally sessile once their byssal threads attach, and Corbicula are hermaphroditic, while zebra mussels rely on external fertilization.

Copending U.S. patent applications Ser. Nos. 511,156 and 510,495 relate to the use of polyquats, particularly polyDMDAAC's, and didecyl dimethyl ammonium halides, individually, to control zebra mussel growth. Copending U.S. patent application Ser. No. 594,451 relates to the use of these components, in combination, to control zebra mussels. None of these applications, however, disclose the novel treatment step of applying the molluscide to ballast waters.

SUMMARY OF THE INVENTION

In accordance with the present invention, there is provided a method for inhibiting the growth of zebra mussels in ballast waters, and therefore in waters into which ballast water is discharged, and a method for controlling fouling caused by zebra mussels in ballast tanks. These methods comprise adding an effective amount for the purpose, preferably a molluscicidally effective amount, of a didecyl dimethyl ammonium halide to ballast water which contains zebra mussels and/or zebra mussel larvae or which is prone to zebra mussel infestation.

DETAILED DESCRIPTION OF THE INVENTION

The instant invention is directed to a method for controlling the growth of zebra mussels in ballast water which contains or is prone to infestation by zebra mussels, comprising adding to such a water an effective amount for the purpose of a didecyl dimethyl ammonium halide. The most preferred compound is didecyl dimethyl ammonium chloride.

A didecyl dimethyl ammonium chloride product is commercially available from Calgon Corporation as H—130. Also, a 50% active, by weight, didecyl dimethyl ammonium chloride is commercially available from Lonza as BARDAC® 2250. This product also contains 10%, by weight, ethanol and 40%, by weight, water.

The expression "controlling the growth of zebra mussels", as used herein, is intended to cover killing, inhibiting the growth of, or preventing the growth of, zebra mussels. In a similar manner, the expression "molluscicidally effective amount" as used herein means an amount which kills, inhibits the growth of, or prevents the growth of zebra mussels in the aqueous systems where the molluscicide is employed.

"Effective amount", as used herein, refers to that amount of compound necessary to accomplish the purpose of the treatment. The effective amount of didecyl dimethyl ammonium halide necessary in the methods of the present invention may vary due to such factors as the ambient temperature of the ballast water being treated, the presence of substances in the water which bind to or otherwise inactivate cationic compounds (for example, silt), the concentration and predominant stage of life cycle of the zebra mussels present in the aqueous system to be controlled, the particular didecyl dimethyl ammonium halide which is employed and other factors. Generally, however, an effective amount will be in the range of from about 0.1 to about 2000 parts per million, preferably about 1 to about 100, and most preferably about 5 to 50 parts per million, based on total weight of active compound added and the total weight of the water in the ballast system being treated.

It is noteworthy that ballast systems may have a "turbidity demand" for cationic compounds. Thus, cationic compounds interact with and are "tied-up" by solids which cause turbidity. The portion of cationic compound "tied-up" by sources of turbidity, such as silt, is believed to be ineffective relative to zebra mussels. For this reason, sufficient compound must be fed to both account for the turbidity demand of the system being treated and to control zebra mussels. A preferred method therefore comprises: a) determining the turbidity level of the ballast system to be treated and the corresponding turbidity demand for the particular compound being fed; b) feeding sufficient compound to react with and tie-up the turbidity present, i.e., to account for the turbidity demand of the ballast system by tieing-up existing turbidity; and c) feeding an effective amount of compound to control zebra mussels. Preferably, feed steps b) and c) can be carried out simultaneously. Step a) involves routine procedures well within the skill of a water-treatment practitioner. Ideally, the instant compounds are added to the ballast water to be treated as soon as possible after the ballast water enters the ballast tanks. This maximizes the time available for these compounds to act on the zebra mussels. Minimally, sufficient residence time should be allowed so as to allow for adequate control of zebra mussels.

The inventor also notes that veligers, which are free-floating planktonic immature zebra mussels or larva, are produced when water temperatures exceed about 13° C. Peak densities occur between about 20° and 22° C., and temperatures in excess of about 37° C. greatly depress veliger development. In most of the United States, zebra mussel reproduction is seasonal.

Thus between the periods when ballast water temperatures rise to about 13° C. (generally in the spring) and fall to below about 13° C. (generally in the autumn) zebra mussels must be treated. It is believed that the instant didecyl dimethyl ammonium halides react with the gills of zebra mussels to effectively suffocate the mussels, though the inventor does not wish to be bound by this mechanism.

Aside from controlling the growth of zebra mussels, the instant invention further relates to a method for controlling the fouling potential of zebra mussels (biofouling caused by zebra mussels) in ballast tanks comprising adding an effective amount of a didecyl dimethyl ammonium halide to ballast water containing zebra mussels or prone to zebra mussel infestation. Ballast systems which are prone to zebra mussel infestation include those wherein ballast water is drawn from a fresh water system which contains zebra mussels.

The cationic compounds employed in the instant methods can be added to the ballast system being treated in any conventional manner and at any point suited to provide ready dissolution and rapid distribution of the compound to all points in the ballast system being treated. Various formulations of the cationic compounds which facilitate their dissolution in water may be prepared in accordance with known methods. Also, other water treatment agents can be added to the system being treated in conjunction with the instant polymers. For example, other biocides, surfactants, scale or corrosion inhibitors, etc. can be used with the instant polymers, absent compatability problems.

The efficacy of didecyl dimethyl ammonium chloride relative to controlling zebra mussels is demonstrated by the following examples.

EXAMPLES 1-6

Static Renewal Tests

Various concentrations of didecyl dimethyl ammonium chloride were established in beakers containing 100 ml of heavily aerated tap water. Ten adult zebra mussels from Lake Erie (*Dreissena polymorpha*), each between 2 mm and 10 mm in shell length, were added to each of the test beakers, as well as to two (2) control beakers containing only heavily aerated tap water. The water was changed daily throughout the test period. Only mussels which were definitely alive (feeding) were used in the test. The zebra mussels were observed daily for signs of life and the results obtained are set forth in the table below.

TABLE 1

STATIC RENEWAL BIOASSAY TEST RESULTS

| Example Number | Inhibitor | Conc. (mg/L Prod.) | Number of Organisms Alive ||||| 
|---|---|---|---|---|---|---|---|
| | | | 0 Hrs. | 24 Hrs. | 48 Hrs. | 72 Hrs. | 96 Hrs. |
| 1* | — | — | 10 | 10 | 10 | 10 | 10 |
| 2* | — | — | 10 | 10 | 10 | 10 | 10 |
| 7 | DDAC[1] | 0.75 | 10 | 10 | 8 | 3 | 0 |
| 8 | DDAC | 1.5 | 10 | 10 | 7 | 1 | 0 |
| 9 | DDAC | 3.0 | 10 | 3 | 0 | 0 | 0 |
| 10 | DDAC | 5.0 | 10 | 0 | 0 | 0 | 0 |

ORGANISM. *Dreissena polymorpha* (Zebra mussel) (10 organisms/conc. 2-10 mm in size)
*Comparison Examples
1. DDAC is 50% didecyl dimethyl ammonium chloride, 10% ethanol and 40% water, by weight, available from Calgon as H-130.

What is claimed is:

1. A method for controlling the growth of zebra mussels in ballast water which contains zebra mussels or which is prone to the growth of zebra mussels comprising adding to said ballast water an effective amount of a didecyl dimethyl ammonium halide.

2. The method of claim 1 wherein said effective amount ranges from about 0.1 to about 2000 ppm, based on the weight of ballast water being treated.

3. The method of claim 2, wherein said didecyl dimethyl ammonium halide is didecyl dimethyl ammonium chloride.

4. A method for controlling the fouling potential of zebra mussels in a ballast tank of a ship, wherein ballast water in said ballast tank contains zebra mussels or is prone to the growth of zebra mussels, comprising adding to said ballast water an effective amount of a didecyl dimethyl ammonium halide.

5. The method of claim 4, wherein said effective amount ranges from about 0.1 to about 2000 ppm, based on the weight of ballast water being treated.

6. The method of claim 5, wherein said didecyldimethyl ammonium halide is didecyldimethyl ammonium chloride.

* * * * *